United States Patent
Matsubara et al.

(10) Patent No.: US 6,728,614 B2
(45) Date of Patent: Apr. 27, 2004

(54) ELECTRICALLY DRIVEN BRAKE DEVICE AND CONTROL APPARATUS THEREOF

(75) Inventors: Kenichiro Matsubara, Chiyoda (JP); Atsushi Yokoyama, Chiyoda (JP); Toshio Manaka, Hitachinaka (JP); Nobuyuki Ueki, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/460,218

(22) Filed: Jun. 13, 2003

(65) Prior Publication Data

US 2003/0233179 A1 Dec. 18, 2003

(30) Foreign Application Priority Data

Jun. 14, 2002 (JP) ........................ 2002-173571

(51) Int. Cl.[7] .................................. B60L 7/00
(52) U.S. Cl. ........................ 701/36; 701/41; 701/70; 188/158
(58) Field of Search ..................... 303/20, 122, 112, 303/172; 188/111 E, 3, 158, 157, 156; 701/36, 41, 70, 78

(56) References Cited

U.S. PATENT DOCUMENTS 6,138,801 A * 10/2000 Shirai et al. ............. 188/157
6,158,822 A * 12/2000 Shirai et al. ............. 303/3
6,425,643 B2 * 7/2002 Shirai et al. ............. 303/112

FOREIGN PATENT DOCUMENTS

JP A-2001-114039 4/2001

* cited by examiner

Primary Examiner—Richard Camry
(74) Attorney, Agent, or Firm—Antonelli, Terry, Stout & Kraus, LLP

(57) ABSTRACT

A power supply system for a vehicle is provided which is able to supply an electric brake apparatus with necessary power even if an abnormal condition occurs in a battery or a conductor which is connected to the electric brake apparatus. A relay control unit 12 normally brings a relay 11 in a state in which its input terminal is connected to an A terminal 13. This causes a generator 50 or main battery 20 to supply an electric brake apparatus 100 with power via first and second power supply lines 40 and 41 and charges an auxiliary battery 21. If an abnormal condition occurs at main and auxiliary batteries 20 and 21, main and auxiliary power supply lines 30 and 31, first and second power supply lines 40 and 41, the relay control unit 12 brings the relay 21 into a state in which its input terminal is connected to A or B terminal 13 or 14 in response to the abnormal condition.

7 Claims, 8 Drawing Sheets

FIG.3

| POSITION | ABNORMAL MODE | TERMINAL TO BE CONNECTED IN RELAY | SUPPLYING OF POWER | |
|---|---|---|---|---|
| | | | FIRST BRAKE LINE | SECOND BRAKE LINE |
| MAIN BATTERY | LOWERING OF STORED POWER | A TERMINAL | MADE | MADE |
| | FAILVRE | A TERMINAL | MADE | NONE |
| AUXILIARY BATTERY | LOWERING OF STORED POWER | A TERMINAL | MADE | MADE |
| | FAILVRE | A TERMINAL | MADE | MADE |
| MAIN POWER LINE | BREAKING | A TERMINAL | MADE | NONE |
| | GROUNDING | A TERMINAL | MADE | NONE |
| AUXILIARY POWER LINE | BREAKING | A TERMINAL | MADE | MADE |
| | GROUNDING | B TERMINAL | MADE | MADE |
| FIRST POWER SUPPLY LINE | BREAKING | A TERMINAL | NONE | MADE |
| | GROUNDING | B TERMINAL | NONE | MADE |
| SECOND POWER SUPPLY LINE | BREAKING | A TERMINAL | MADE | NONE |
| | GROUNDING | A TERMINAL | MADE | NONE |

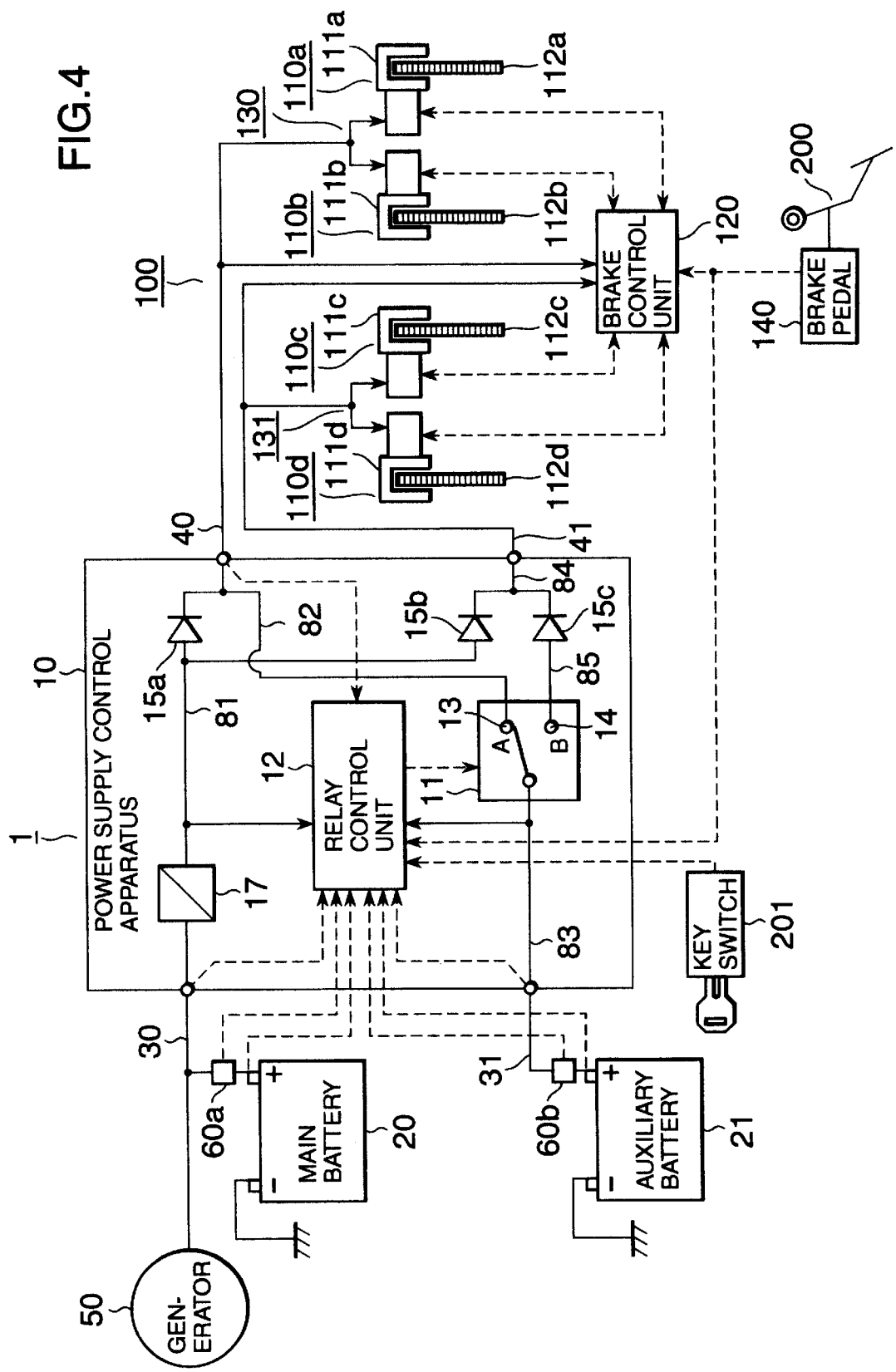

FIG.5

| TYPE OF DC-DC CONVERTER | STEP-UP | STEP-DOWN |
|---|---|---|
| VOLTAGE GENERATED BY GENERATOR | LOW | HIGH |
| STANDARD VOLTAGE OF MAIN BATTERY | LOW | HIGH |
| STANDARD VOLTAGE OF AUX. BATTERY | HIGH | LOW |
| MAIN OPERATION VOLTAGE OF ELECTRIC BRAKE APPARATUS | HIGH | LOW |

| TYPE OF BIDIRECTION DC-DC CONVERTER | I | II |
|---|---|---|
| VOLTAGE GENERATED BY GENERATOR | LOW | HIGH |
| STANDARD VOLTAGE OF MAIN BATTERY | LOW | HIGH |
| STANDARD VOLTAGE OF AUX. BATTERY | HIGH | LOW |
| MAIN OPERATION VOLTAGE OF ELECTRIC BRAKE APPARATUS | LOW | HIGH |

ELECTRICALLY DRIVEN BRAKE DEVICE AND CONTROL APPARATUS THEREOF

BACKGROUND OF THE INVENTION

The present invention relates to a vehicle power supply system.

As prior art vehicle power supply system, a power control apparatus, power supply abnormal condition detecting apparatus and vehicle brake system which are disclosed in JP-A-2001-114039 are known. This power control apparatus, power supply abnormal condition detecting apparatus and vehicle brake system are configured to connect an alternator, a main power supply apparatus including a main battery, and an auxiliary battery to a control apparatus including a brake ECU of an electric brake system an electric motor and the like via a main and auxiliary current supply lines for inputting voltages of the alternator, main power supply apparatus and part of a voltage of the main power supply apparatus input to the control apparatus to the power supply ECU as main power supply monitor signals. If there are inputs of the main power supply monitor signals, both the main power supply apparatus and the main current supply line are normal. If there is no input of the main power supply monitor signals although there is an input from the main power supply apparatus, and a signal representing no application of a voltage is generated, an abnormal condition of the main current supply line such as breaking thereof occurs. The auxiliary battery is connected to the control apparatus by closing a relay for this purpose for supplying a current.

Thus, a power supply control apparatus which is able to cope with the abnormal conditions of current supply lines, a power supply abnormal condition detecting apparatus and a vehicle brake system which is capable of coping with aforementioned abnormal conditions in both cases are provided.

If an abnormal condition occurs in the main current supply line in the above-mentioned prior art, the auxiliary battery is then connected to the control apparatus for supplying the control apparatus with a current. However, the prior art provides for taking no countermeasure if an abnormal condition occurs in, for example, a current supply line which connect the brake ECU with the electric motor.

It is an object of the present invention to provide a highly reliable vehicle power supply system which is capable of positively supplying an electric brake apparatus with necessary power even if an abnormal condition occurs in any one of all the conductors which are connected to a battery or an electric brake apparatus.

BRIEF SUMMARY OF THE INVENTION

The above-mentioned object of the present invention is accomplished by providing connection switching means for connecting said auxiliary battery to any one of said plurality power supply lines. Since this allows at least one brake line of the electric brake apparatus to be positively supplied with power, necessary braking force can be generated.

The above-mentioned object of the present invention is accomplished by providing connection switching means for connecting said auxiliary battery to said main battery of at least one of said plurality power supply line. Since this allows at least one brake line of the electric brake apparatus to be positively supplied with power, necessary braking force can be generated.

The above-mentioned object of the present invention is accomplished by providing connection switching means for connecting said main battery to said plurality of power supply lines and for connecting said auxiliary battery to any one of said plurality power supply lines. Since this allows at least one brake line of the electric brake apparatus to be positively supplied with power, necessary braking force can be generated.

Preferably, diodes for preventing currents from flowing back to said main battery may be provided between said main battery and said plurality of power supply lines and a diode for preventing a current from flowing back to said connection switching means may be provided between said connection switching means and at least one of said power supply lines. Since this allows at least one brake line of the electric brake apparatus to be positively supplied with power, necessary braking force can be generated.

Preferably, connection of said auxiliary battery may be switched by said connection switching means in response to a current discharged from at least main and auxiliary batteries. Since this allows at least one brake line of the electric brake apparatus to be positively supplied with power, necessary braking force can be generated.

Preferably, connection of said auxiliary battery may be switched by said connection switching means in response to a current flowing through a conductor which is not provided with a diode of the conductors disposed between said connection switching means and said plurality of power supply lines, or a current flowing through a conductor disposed between said auxiliary battery and said connection switching means. Since this allows at least one brake line of the electric brake apparatus to be positively supplied with power, necessary braking force can be generated.

Other objects, features and advantages of the invention will become apparent from the following description of the embodiments of the invention taken in conjunction with the accompanying drawings.

BRIEF DESCRIPTION OF THE SEVERAL VIEWS OF THE DRAWING

FIG. 3 is a table showing the relations between the abnormal conditions at various positions and supplying of power to brake systems;

FIG. 4 is a schematic view showing the configuration of the whole of the vehicle power supply system of the embodiment 2 of the present invention;

FIG. 5 is a table showing the relations between the types of the DC—DC converter and their voltages;

DETAILED DESCRIPTION OF THE INVENTION

Figure 1:
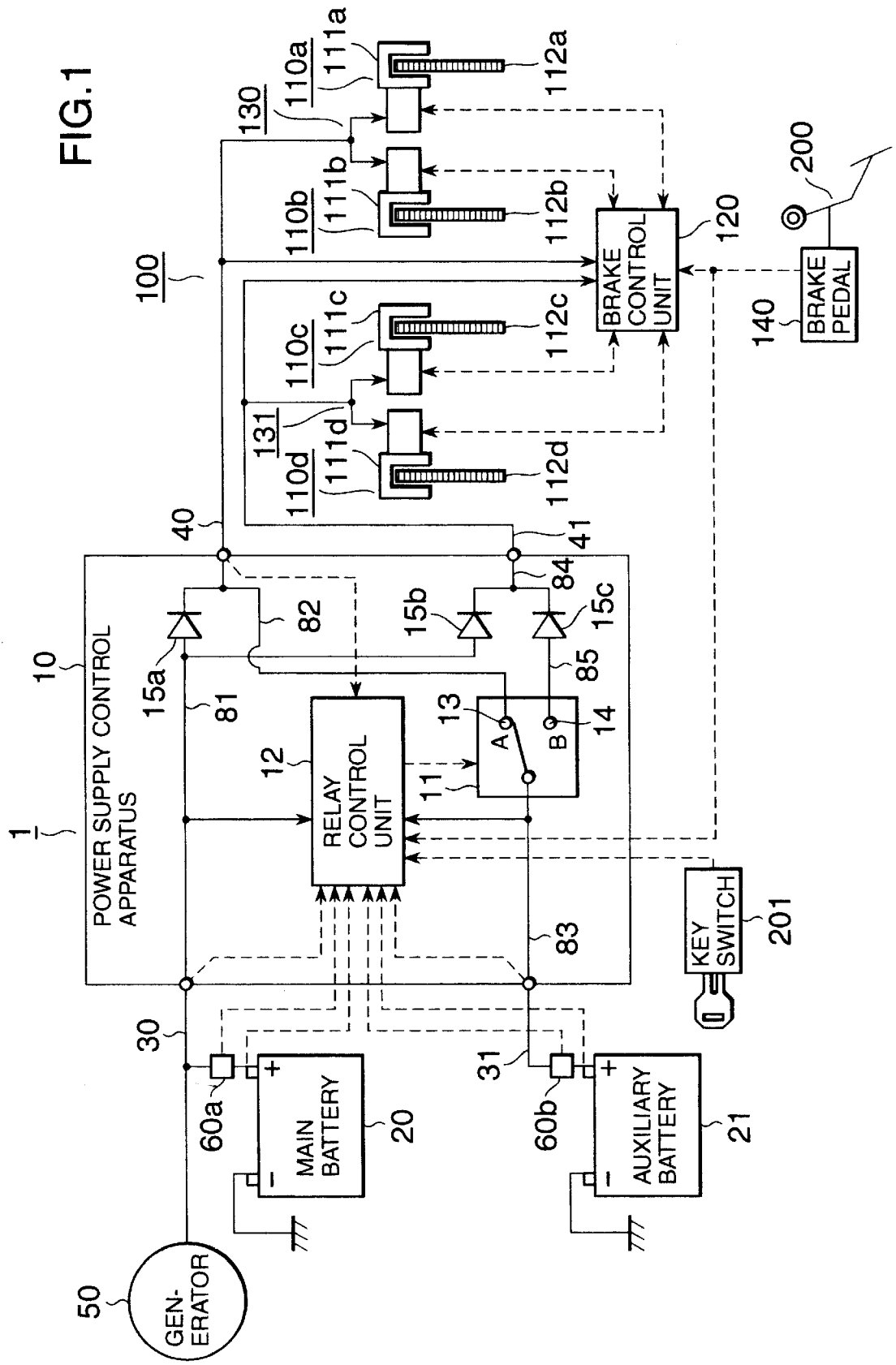
FIG. 1 is a schematic view showing the configuration of the whole of the vehicle power supply system of the embodiment 1 of the present invention.

Referring now to FIG. 1, there is showing the general structure of a power supply system 1 for supplying electric power to a vehicle in accordance with an embodiment 1 of the present invention. In this embodiment, an electric brake apparatus 100 is connected to the vehicle power supply system 1. In FIG. 1, signal lines are represented by dotted lines.

In FIG. 1, the vehicle power supply system 1 comprises a power supply control apparatus 10, main battery 20, auxiliary battery 21, main power line 30, auxiliary power line 31, a first second power supply lines 40 and 41 and a power generator 50.

The main battery 20 is charged by the generator 50 and supplies the stored power to the power supply control apparatus 10 via the main power line 30.

The auxiliary battery 21 is charged by the generator 50 or the main battery 20 and supplies the stored power to the power supply control apparatus 10 via the auxiliary power line 31.

The main and auxiliary batteries 20 and 21 are provided with current sensors 60a and 60b at the positive terminals thereof, respectively.

In the embodiment 1, the main and auxiliary batteries 20 and 21 have an equal standard voltage such as 12, 24 and 36 volts.

The power generator 50 is driven by an engine (not shown) for generating an electric power.

The generated electric power is stored in the main battery 20 and is supplied to the power supply control apparatus 10. The generator 50 may include alternator, motor generator, etc.

In FIG. 1, the power supply control apparatus 10 comprises a relay 11, which serves as a connection switching device, relay control unit 12 and diodes 15a, 15b and 15c.

The power supply control apparatus 10 is provided with a power conductor 81 which connects the main power line 30 with the diodes 15a and 15b and a power conductor 82 which connects the first power supply line 40 with the diode 15a and the A terminal 13 of the relay 11.

The power supply control apparatus 10 is further provided with a power conductor 83 which connects the auxiliary power line 31 with the relay 11 and a power conductor 84 which connects the second power supply line 41 with the diodes 15b and 15c.

The power supply control apparatus 10 is further provided with a power conductor 85 which connects the B terminal 14 of the relay 11 with the diode 15c.

The diode 15a serves to prevent a current from backflowing from the conductors 82 to 81.

The diode 15b serves to prevent a current from backflowing from conductors 84 to 81.

The diode 15c serves to prevent a current from backflowing from the lines 84 to 85.

Alternatively, the diode 15c which is provided between the relay 11 and second power supply line 41 may be removed and be placed between the relay 11 and the first power supply line 40.

The relay 11 has the A and B terminals 13 and 14, one of which the input terminal is to be connected is determined by the relay control unit 12.

The relay control unit 12 selects one of terminals of the relay 11 to be connected to its input terminal based upon a signals from a key switch 201, brake sensor 140 and gas pedal sensor (not shown), voltages on the terminals of the main and auxiliary batteries 20 and 21 and charged and discharged current thereto and therefrom, voltages on the main power line 30, auxiliary power line 31 and first power supply line 40.

The relay control unit 12 is supplied with power from both main and auxiliary power lines 30 and 31.

In FIG. 1, the electric brake apparatus 100 comprises four disc brake assembly 110a, 110b, 110c, 110d, brake control unit 120 and brake sensor 140.

Both two disc brake assemblies 110a, 110b are supplied with power from the first power supply line 40 and constitute a first brake system 130.

Both two disc brake assemblies 110c and 110d are supplied-with power from the second power supply line 41 and constitute a second brake system 131.

Allocation of the brake systems 130, 131 to four wheels may include allocation of the first brake system to two front wheels and of the second brake system to two rear wheels and allocation of the first brake system to left and front wheel and right and rear wheel and of the second brake system to right and front wheel and left and rear wheel. The vehicle power supply system 1 of the present invention is applicable to any allocation.

The brake control unit 120 calculates braking forces which are to be generated in the disc brake assemblies 110a, 110b, 110c and 110d based upon output signals of the brake sensor 140 for outputting control signals to the disc brake assemblies 110a, 110b, 110c, 110d for generating the necessary braking forces.

The brake sensor 140 detects a depressing force imposed upon the brake pedal 200 or the stroke of the pedal 200 for outputting a signal representing it to the brake control unit 120.

In FIG. 1, the disc brake assembly 110 comprises a brake actuator 111 and a disc rotor 112 which is rotated together with the wheel (not shown).

The brake actuator 111 is supplied with electric power from the first or second power supply line 40 or 41 for biasing a pad (not shown) to upon the disc rotor 112 based in response to a control signal from the brake control unit 120 to generate a brake force.

The brake actuator 111 incorporates a motor for generating a biasing force and a driver for driving the motor. In other words, the embodiment 1 is an exemplary configuration in which the driver is provided below springs. However, the vehicle power supply system 1 of the embodiment 1 is applicable to a configuration in which the driver is provided above the springs, so that no alternation in configuration is required.

In FIG. 1, the relay 11 is normally in a state in which its input terminal is connected to the A terminal 13. When the engine (not shown) is in operation to drive the generator 50 for generating power, the power which is generated by the generator 50 is stored in the main battery 20 and is supplied to the electric brake apparatus 100 via the first and second power supply lines 40 and 41 and is stored in the auxiliary battery 21 via the auxiliary power line 31.

When the engine is not in operation so that the generator 50 is not driven for power generation, the electric power stored in the main and auxiliary batteries 20 and 21 is supplied to the electric brake apparatus 100 via the first and second power supply lines 40 and 41.

In case where a starter (not shown) for starting the operating of the engine is connected to the main battery 20, the voltage on the terminal of the main battery 20 may lower than the lower limit of the operation voltage of the disc brake apparatus 110 or the brake control unit 120 due to the current discharge from the main battery which is associated with the starting of the engine. Since the voltage of the auxiliary battery 21 which is not influenced by the starting of the engine is positively applied to the disc brake assemblies 110a, 110b and brake control unit 120 over the first power supply line 40 in accordance with the vehicle power supply system 1 of the embodiment 1 of the present invention, the operation of the disc brake assemblies 110a, 110b and the brake control unit 120 can be positively assured for generating a braking force even during the starting of the engine.

As mentioned above, the electric brake apparatus 110 can be positively operated with the power from the generator 50, main and auxiliary batteries 20 and 21, respectively by using the vehicle power supply system 1 of the embodiment 1 of the present invention, so that necessary braking forces can be generated by the disc brake assemblies 110a, 110b, 110c, 110d.

Now, processing in the relay control unit which the vehicle power supply system 1 of the present invention comprises will be described in detail with reference to FIG. 2.

Figure 2:
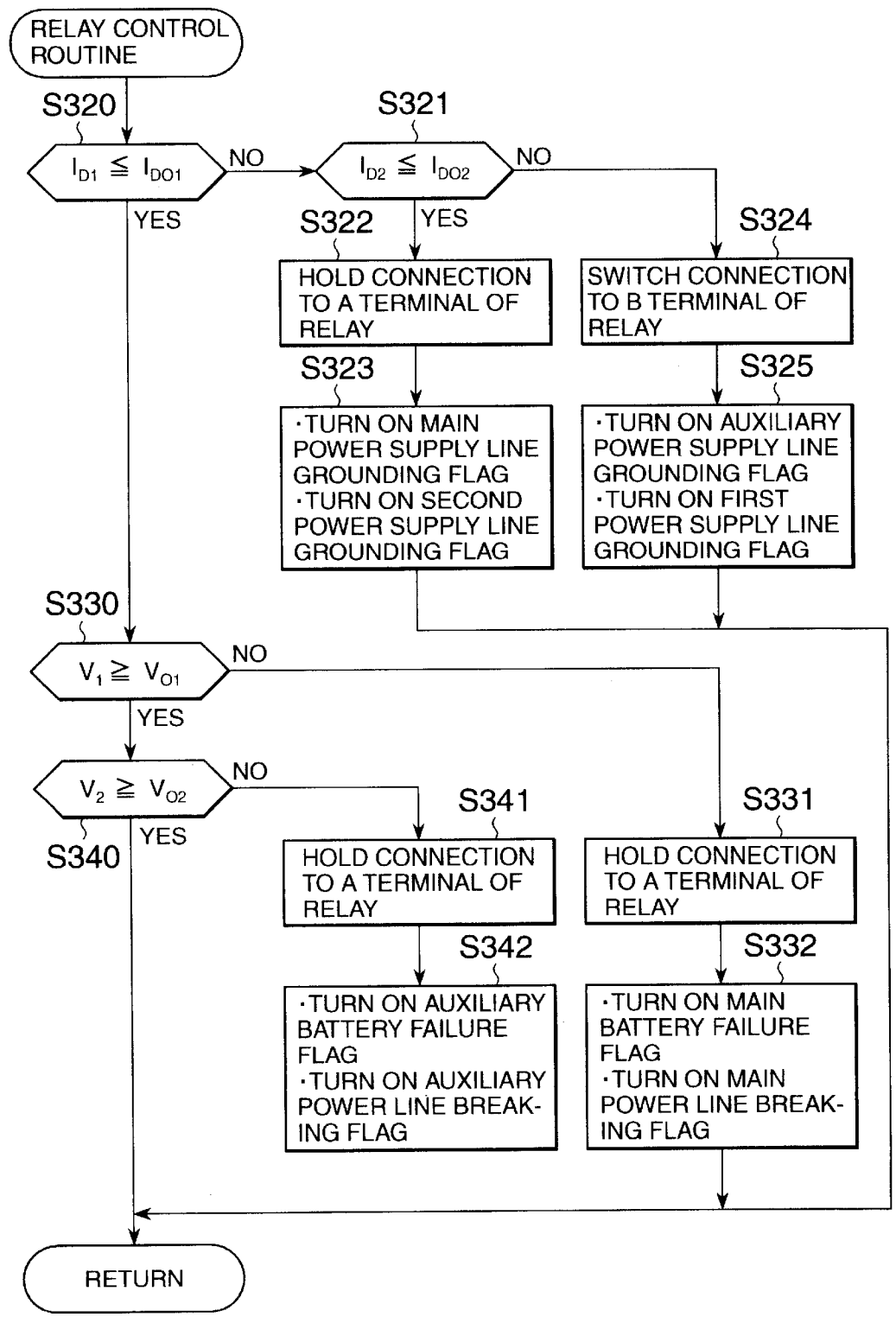
FIG. 2 is a flow chart showing a program routine which is executed by the relay control unit.

Referring now to FIG. 2, there is shown a flow chart of a program routine which is executed by the relay control unit 20. The program routine shown in FIG. 2 is repeatedly executed at established intervals. When the routine of FIG. 2 is initiated, processing at step 320 is executed.

A determination whether or not the current ID1 discharged from main battery 20 is equal to or less than a given value ID01 is made at step 320. If $ID1 \leq ID01$, then processing at step 330 is executed. If a relation $ID1 \leq ID01$ is not established, processing at step 320 is then executed.

ID01 represents a value on which presence or absence of the grounding of the main power line 30, auxiliary power line 31, first and second power supply lines 40 and 41 can be determined, such as, a maximum value of the current which is required by the power supply control apparatus 10 and electric brake apparatus 100.

At step 321, a determination whether or not the current ID2 which is discharged from the auxiliary battery 21 is equal to or less than a given value ID02 is made. If a relation $ID2 \leq ID02$ is established, then the processing at step 322 is executed. If a relation $ID2 \leq ID02$ is not established, then processing at step 324 is executed.

ID02 represents a maximum value based on which presence or absence of grounding of the auxiliary power line 31, first and second power supply lines 40 and 41 can be determined, such as a maximum value of the current which is required by the power supply control apparatus 10 and electric brake apparatus 100.

At step 322, processing for holding the relay 11 in a state its input terminal is connected to the A terminal 13 is executed since only the current discharged from the main battery 20 exceeds a given value ID01, so that it is presumed that main power line 30 or the second power supply line 41 is grounded. By holding the relay 11 in a state that the input terminal is connected to the A terminal 13, power can be supplied to the electric brake apparatus 100 via the first power supply line 40 from the auxiliary battery 21. Although only the first brake system 130 is supplied with power at this time, necessary brake forces can be generated by the disc brake assemblies 110a, 110b.

At step 323 which is subsequent to the processing at step 322, processing for turning on flags representing the grounding of the main power supply line and a second power supply line is executed. This causes this routine to be terminated.

In response to processing at step 323, a vehicle control unit (not shown) alarms a driver to an abnormal condition by flickering an alarm light or beeping an alarm buzzer.

At step 324, processing for switching the relay 11 to a state in which its input terminal is connected to the B terminal 14 is executed since the currents discharged from the main battery 20 and the auxiliary battery 21 exceed given values ID01, ID02, respectively, so that it is presumed that the auxiliary power line 31 or the first power supply line 40 is grounded. Accordingly, by switching the relay 11 into a state in which the input terminal is connected to the B terminal, the electric brake apparatus 100 can be supplied with power via the first and second power supply lines 40 and 41 from the generator 50 or the main battery 20, even if the auxiliary power line 31 is grounded. Even if the first power supply line 40 is grounded, the electric brake apparatus 100 can be supplied with power via the second power supply line 41 from the auxiliary battery 21. Although only second brake system 131 is supplied with power this time, necessary braking forces can be generated by the disc brake assemblies 110c, 110d.

Since the brake control unit 120 detects supplying of power from the first and second power supply lines 40 and 41 immediately after switching the relay 11 into a state in which its input terminal is connected to the B terminal 14, a determination which one of the auxiliary power supply line 31 and the first power supply line is grounded can be made.

Since the relay is normally in a state that its input terminal is connected to the A terminal 13, grounding of the first power supply line can be detected even by the current sensor 60b.

At step 325, processing for turning on the flag representing the grounding of the auxiliary power supply or the first power supply line is executed in response to the processing at step 324. This causes this routine to be terminated.

In response to the processing at step 328, the vehicle control unit (not shown) alarms the operator to the abnormal condition by, for example, flickering the alarm light or beeping the alarm buzzer.

At step 330, a determination whether or not the voltage V1 on the main power line 30 is equal to or higher than a given value V01 is made. If a relation $V1 \geq V01$ is established, then processing at step 340 is executed. If a relation $V1 \geq V01$ is not established, processing at step 331 is executed.

V01 is a value based on which presence of failure of the main battery 20 and braking of main power line 30 can be determined, for example, a terminal voltage of the main battery 20 when maximum current which is required by the power supply control apparatus 10 and electric brake apparatus 100 is discharged from the main battery 20.

At step 331, processing for holding the relay 11 in a state in which its input terminal is connected to the A terminal 13 is conducted since the voltage on the main power line 30 is lower than a given value V01, in other words, it is presumed that the main battery 20 is dead or the main power line 30 is broken. By holding the relay 11 in a state that its input terminal is connected to the A terminal 13, the electric brake apparatus 100 can be supplied with power via the first power supply line 40 from the auxiliary battery 21. Although only the first brake system 130 is supplied with power at this time, necessary brake forces can be generated by the disc brakes 110a, 110b.

Failure of the main battery 20 may include disconnection of the power line from the terminal of the main battery 20.

At step 332, processing for turning on the flag representing failure of the main battery or the breaking of main power line is executed in response to the processing at step 331. This causes this routine to be terminated.

In response to the processing at step 332, the vehicle control unit (not shown) alarms the operator to the abnormal condition by, for example, flickering the alarm light or beeping the alarm buzzer.

At step 340, a determination whether or not the voltage V1 on the auxiliary power line 31 is equal to or higher than a given value V02 is made. If a relation V2≧V02 is established, then processing is terminated. If a relation V2≧V02 is not established, processing at step 341 is executed.

V02 is a value based on which presence of failure of the auxiliary battery 21 and braking of auxiliary power line 31 can be determined, for example, a terminal voltage of the auxiliary battery 21 when maximum current which is required by the power supply control apparatus 10 and electric brake apparatus 100 is discharged from the auxiliary battery 21.

At step 341 processing for holding the relay 11 in a state in which its input terminal is connected to the A terminal 13 is conducted since the voltage on the auxiliary power line 31 is lower than a given value V02, in other words, it is presumed that the auxiliary battery 21 is failed or the auxiliary power line 31 is broken. By holding the relay 11 in a state that its input terminal is connected to the A terminal 13, the electric brake apparatus 100 can be supplied with power via the first power supply line 40 from the main battery 20.

Failure of the main battery 20 may include disconnection of the power line from the terminal of the main battery 20.

At step 342, processing for turning on the flag representing the failure of the auxiliary power supply or the breaking of the auxiliary power line is executed in response to the processing at step 341. This causes this routine to be terminated.

In response to the processing at step 342, the vehicle control unit (not shown) alarms the operator to the abnormal condition by, for example, flickering the alarm light or beeping the alarm buzzer.

Since the grounding of the conductor 81 can be considered as an event which is equivalent to that of the main power line 30, the relay control unit 12 is capable of detecting the grounding of the conductor 81. Since the grounding of the conductor 82 can be considered as an event which is equivalent to that of the first power supply line 40, the relay control unit 12 is capable of detecting the grounding of the conductor 82. Since the grounding of the conductor 83 can be considered as an event which is equivalent to that of the auxiliary power supply line 31, the relay control unit 12 is capable of detecting the grounding of the conductor 83. Since the grounding of the conductor 84 can be considered as an event which is equivalent to that of the second power supply line 41, the relay control unit 12 is capable of detecting the grounding of the conductor 84.

As mentioned above, the vehicle power supply system 1 of the embodiment 1 of the present invention enables the relay 11 to properly connect its input terminal to its output terminal in response to the abnormal conditions of all conductors which are connected to main battery 20, auxiliary battery 21 or electric brake apparatus 100. Since this enables at least one brake system 130, 131 of the electric brake apparatus 100 and the brake control unit 120 to be positively supplied with power, necessary braking force can be generated.

The charged or stored power of the main and auxiliary batteries 20 and 21 may be considered in the routine shown in FIG. 2. Specifically, a determination whether or not the stored power C1 and C2 of the main and auxiliary batteries 20 and 21 are equal to or given values C01 and C02, respectively is made. If a relation C1≧C01 or C2≧C02 is not established, then a flag representative of lowering of the stored power of the main or auxiliary battery is turned on. In response thereto, the vehicle control unit (not shown) will take an appropriate countermeasure such as charging by the generator 50 or reduction in power consumption. Since this assures the stored power of the main and auxiliary batteries 20 and 21, the reliability on the vehicle power supply system 1 and electric brake apparatus 100 can be further enhanced.

C01 and C02 denote such stored power that the voltages on the terminals of the main and auxiliary battery 20 and 21 will not be lower than the lower limit of the operative voltage of the power supply control apparatus 10 and the electric brake apparatus even if the maximum current which is required by at least the power supply control apparatus 10 and the electric brake apparatus 100 is discharged from the main and auxiliary battery 20 or 21. The values C01 and C02 may not necessarily be set as mentioned above and may be freely set depending upon the type, standard voltage, capacity, etc. of the main or auxiliary battery 20 or 21 in so far as the power supply control apparatus 10 and the electric brake apparatus 100 can be appropriately operated.

Even if the stored power C1 of the main battery 20 is lower than C01, or the stored power C2 of the auxiliary battery 21 is lower than C02, necessary forces can be generated since the electric brake apparatus 100 can be supplied with given power.

The stored power C1 and C2 of the main and auxiliary battery 20 and 21 is detected based upon the terminal voltage, charged or discharged current, temperature, etc. of the main and auxiliary batteries 20 and 21. The main and auxiliary batteries 20 and 21 may be provided with sensors which detect their specific weights of the battery liquids, so that the stored power C1 and C2 can be measured based upon the detected specific weights of the battery liquids.

FIG. 3 is a table showing that supplying of each brake system with power is made or not for the abnormal conditions at each position in accordance with the relay control routine shown in FIG. 2. Braking of the first and second power supply lines 40 and 41 is not detected in the relay control routine, but is detected by the brake control apparatus 120 which is powered by the first and second power supply lines 40 and 41.

As shown in FIG. 3, the vehicle power supply system 1 of the embodiment 1 of the present invention is adapted to switch the relay 11 into a state in which its input terminal is connected to the B terminal 14 when grounding of the auxiliary power line 31 or the first power supply line 40 is detected. Since this causes at least one of the first and second power supply lines 40 and 41 is positively supplied with power, the electric brake apparatus 100 can be positively operated.

When the voltage of the auxiliary power line 31 is different from that of the first power supply line 40, it can be determined that the relay 31 has been switched into a state in which its input terminal is connected to the B terminal 14.

Since grounding of the auxiliary power line 31 or the first power supply line 40 can be detected by measuring a current flowing through any one of the auxiliary power line 31, the first power supply line 40, conductors 82, 83 which are connected to the auxiliary power line 31 and the first power supply line 40, the relay 11 may be switched to a state in which its input terminal is connected to the B terminal 14 in response to the measurement.

When both the first and second power supply lines 40 and 41 are supplied with power from the generator 50 or the main battery 20 under normal conditions, the relay 11 can be temporarily switched to a state that its input terminal is connected to the B terminal 14. Since this causes the auxiliary battery 21 not to be supplied with power from the generator 50 or the main battery 20, failure of the auxiliary battery 21 and braking of the auxiliary power line 31 can be easily detected by checking the voltage on the auxiliary power line 31 Simultaneously, sticking of the relay 11 can also be detected.

Embodiment 2

FIG. 4 shows the configuration of the whole of the vehicle power supply system 1 of the embodiment 2 of the present invention. In the embodiment 2, the electric brake apparatus 100 is connected as an electric apparatus. Components in the embodiment 2 which are identical to those in the embodiment 1 are represented by identical reference numerals and description thereof will be omitted for simplicity of illustration.

Embodiment 2 is similar to embodiment 1 except that a DC—DC converter 17 for converting the voltage on the main power line 30 is provided between the main power line 30 and the diode 15a.

In FIG. 4, the DC—DC converter 17 is configured to convert the voltage which is generated by the generator 50 or the terminal voltage of the main battery 20. The converted power is supplied to the electric brake apparatus 100 via the first and second power supply lines 40 and 41 and is stored in the auxiliary battery 21. The voltage output from the DC—DC converter 17 is substantially equal to the main operation voltage of the electric brake apparatus 100 and the main charged voltage of the auxiliary battery 21.

Although the DC—DC converter 17 may be configured to step up the input voltage (hereinafter referred to as "step-up type") or to step down the input voltage (hereinafter referred to as "step-down type"), it may be any type in the vehicle power supply system 1 of the embodiment 2 of the present invention.

FIG. 5 is a table showing the relations between the types of the DC—DC converter and voltages. If the DC—DC converter 17 is of step-up type, the voltage generated by the generator 50 and the standard of the main battery 20 are low and the standard voltage of the auxiliary battery 21 and the main operation voltage of the electric brake apparatus 100 are high.

If the DC—DC converter 17 is of step-down type, the voltage generated by the generator 50 and the standard voltage of the main battery 20 are high and the standard voltage of the auxiliary battery 21 and the main operation voltage of the electric brake apparatus 100 are low. The terms used herein "high" and "low" means the range about 12 to 14 voltages and the range about 36 to 42 voltages, respectively.

Since the vehicle power supply system 1 of the embodiment 2 of the present invention is equipped with two batteries (main and auxiliary batteries 20 and 21) having different standard voltages as mentioned above, a plurality of electric apparatus having different operation voltages, other than the electric brake apparatus 100 can be supplied with power from the main and auxiliary batteries 20 and 21.

Also in the vehicle power supply system 1 of the embodiment 2 of the present invention, appropriate connection of the relay 11 can be selected in response to the abnormal conditions of all conductors which are connected to the main and auxiliary batteries 20 and 21, or the electric brake apparatus 100. This allows at least one of the brake systems 130, 131 of the electric brake apparatus 100 and the brake control unit 120 to be positively supplied with power, necessary braking forces can be generated.

If it is determined based upon the signals from a key switch 201, brake sensor 140, accelerator sensor (not shown) that no generation of braking force by the electric brake apparatus 100 is required under normal conditions, the relay 11 can be temporarily switched to a state in which its input terminal is connected to the B terminal 14 while the DC—DC converter 17 is initiated. Since this allows the brake control apparatus 120 to be supplied with only the power of the auxiliary battery 21, breaking of the conductor 81 can be easily detected by checking the supplying of power to the brake control unit 120 and simultaneously, sticking of the relay 11 can be detected.

Embodiment 3

Figure 6:
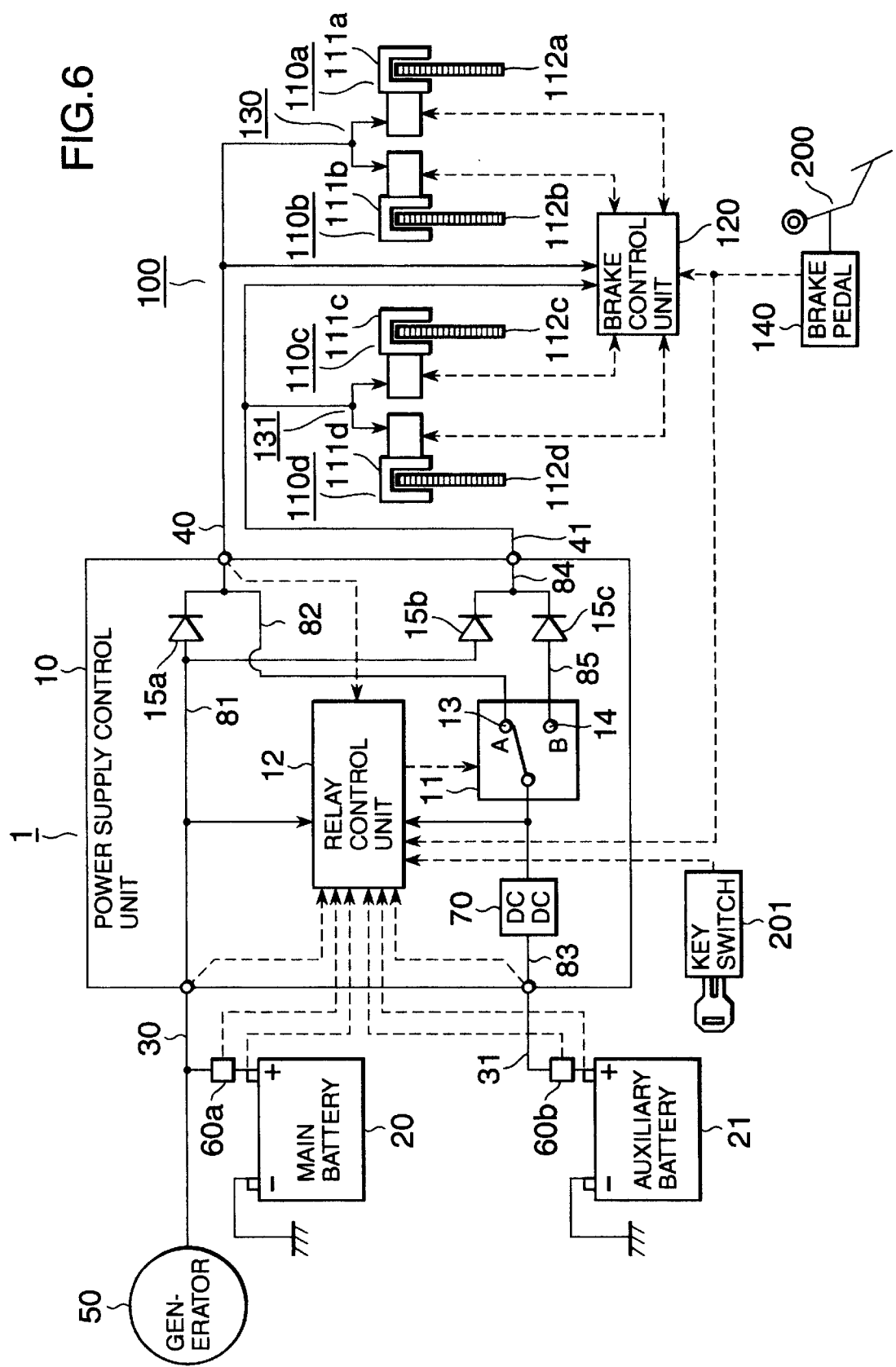
FIG. 6 is a schematic view showing the configuration of the whole of the vehicle power supply system of the embodiment 3 of the present invention.

FIG. 6 shows the configuration of the whole of the vehicle power supply system 1 of the embodiment 2 of the present invention. In the embodiment 3, the electric brake apparatus 100 is connected as an electric apparatus. Components in the embodiment 2 which are identical to those in the embodiment 1 are represented by identical reference numerals and description thereof will be omitted for simplicity of illustration.

The embodiment 3 is similar to the embodiment 1 except that a bidirectional DC—DC converter 70 which is capable of supplying power in both directions is provided between the main power line 31 and the relay 11.

Figures 7, 8:
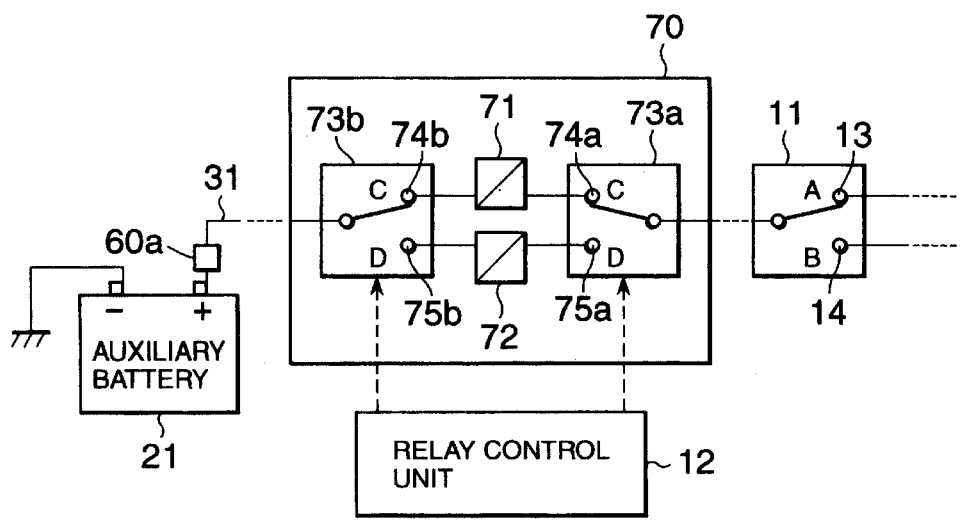
FIG. 7 is a circuit diagram showing an example of the bidirectional DC—DC convertor.
FIG. 8 is a table showing the relations between the types of the DC—DC converter and their voltages.

FIG. 7 shows an exemplary configuration of a bidirectional DC—DC converter 70. As shown in FIG. 7, the bidirectional DC—DC converter 70 comprises a first DC—DC converter 71, second DC—DC converter 72 and the relay 73.

The first DC—DC converter 71 is configured to convert the voltage which is generated by the generator 50 or the voltage of the main battery 20 (hereinafter referred to as "first conversion operation"). The converted power is stored in the auxiliary battery 21. The second DC—DC converter 72 is configured to convert the voltage of the auxiliary battery 21 (hereinafter referred to as "second conversion operation"). The converted power is supplied to the electric brake apparatus 100.

The relay 73 comprises C and D terminals 74 and 75, respectively. The input terminal is connected to the C and D terminal 74 and 75 in the first and second conversion operations, respectively. Selection between the C and D terminals 74 and 75 is conducted by the relay control unit 12.

The bidirectional DC—DC converter 70 may be configured so that the first and second DC—DC converters 71 and 72 are step-down and step-up types, respectively (hereinafter referred to as "I type"), or so that the first and second DC—DC converters 71 and 72 are step-up and step-down types, respectively (hereinafter referred to as "II type"). In the vehicle power supply system 1 of the embodiment 3 of the present invention, the converter 70 may be any of the I and II types.

FIG. 8 is actable showing the relations between the types of the DC—DC converter and voltages. If the DC—DC converter 70 is of I type, the voltage generated by the generator 50, the standard voltage of the main battery 20 and the main operation voltage of the electric brake apparatus 100 are low and the standard voltage of the auxiliary battery 21 is high. If the DC—DC converter 70 is of II type, the voltage generated by the generator 50, the standard voltage of the main battery 20 are high and the main operation voltage of the electric brake apparatus 100 is low and the standard voltage of the auxiliary battery 21 is low.

The terms used herein "high" and "low" means the range about 12 to 14 voltages and the range about 36 to 42 voltages, respectively.

Since the vehicle power supply system 1 of the embodiment 3 of the present invention is equipped with two batteries (main and auxiliary batteries 20 and 21) having different standard voltages as mentioned above, a plurality of electric apparatus having different operation voltages, other than the electric brake apparatus 100 can be supplied with power from the main and auxiliary batteries 20 and 21.

Also in the vehicle power supply system 1 of the embodiment 3 of the present invention, appropriate connection of the relay 11 can be selected in response to the abnormal conditions of all conductors which are connected to the main and auxiliary batteries 20 and 21, or the electric brake apparatus 100. This allows at least one of the brake systems 130, 131 of the electric brake apparatus 100 and the brake control unit 120 to the positively supplied with power, necessary braking forces can be generated.

Switching of the input terminal from the C terminal 74 to the D terminal 75 in the relay 71 should not necessarily be synchronized with switching of the connection of the input terminal from the A terminal 13 to the B terminal 14 in the relay 11. For example, the input terminal of the relay 73 may be switched to the D terminal 75 after the stored power capacity of the auxiliary battery 21 reaches a given upper limit by connecting the input terminal of the relay 73 to the C terminal 74 for charging the auxiliary battery 21. Since this allows the second DC—DC converter 72 to supply power, the second DC—DC converter 72 is able to momentarily cope with the abnormal conditions at which it should supply power to the electric brake apparatus 100. When the stored power in the auxiliary battery 21 reaches a given lower limit, charging of the auxiliary battery is initiated by switching the relay 73 into a state in which its input terminal is connected to the C terminal 74.

Embodiment 4

Figure 9:
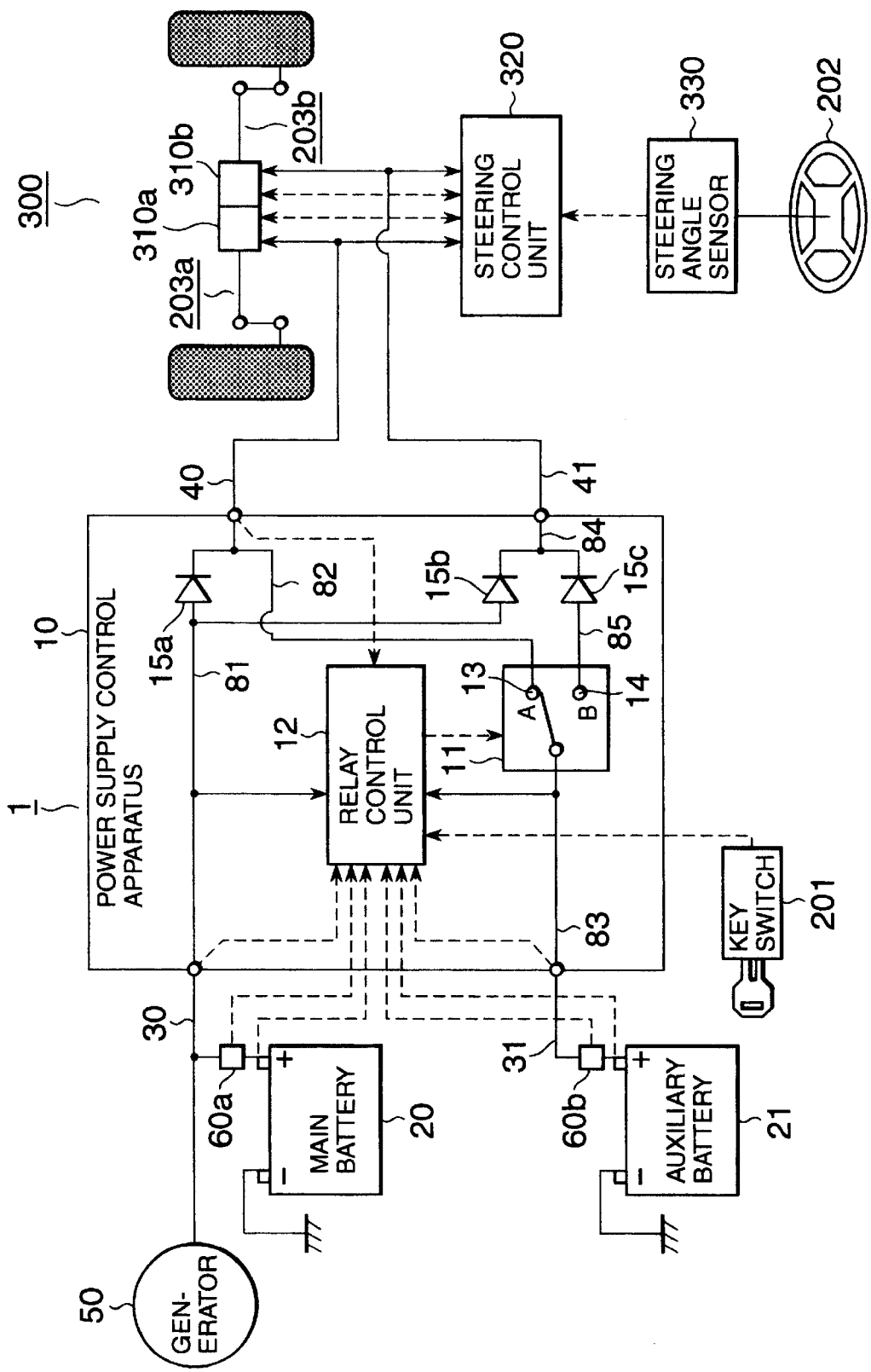
FIG. 9 is a schematic view showing the configuration of the whole of the vehicle power supply system of the embodiment 4 of the present invention.

FIG. 9 shows the configuration of the whole of the vehicle power supply system 1 of the embodiment 4 of the present invention. In the embodiment 4, an electric steering apparatus 300 is connected as an electric apparatus. Components in the embodiment 4 which are identical to those in the embodiment 1 are represented by identical reference numerals and description thereof will be omitted for simplicity of illustration.

Embodiment 4 is similar to embodiment 1 except that the electric steering apparatus 300 is additionally connected to the vehicle power supply system 1.

As shown in FIG. 9, an electric steering apparatus 300 comprises two steering actuators 310a, 310b, steering control unit 320 and steering angle sensor 330.

The steering actuators 310a, 310b are supplied with power from the first and second power supply lines 40 and 41 for moving tie rods 203a, 203b, respectively in a right and left direction in response to a control signal from the steering control unit 320. This accomplishes the steering.

The steering control unit 320 computes the amount of the movement of each of the steering actuators 310a, 310b based upon the signals from the steering angle sensor 330 for outputting a control signal representing the movement amount to each of the steering actuators 310a, 310b. The steering control unit 320 is supplied with power from both the first and second power supply lines 40 and 41.

The steering angle sensor 330 detects the rotational angle of the steering wheel 202, etc. for outputting a signal representing it to the steering control unit 320.

In the vehicle power supply system 1 of the embodiment 4 of the present invention, the electric steering apparatus can be appropriately operated with power from the generator 50, main and auxiliary batteries 20 and 21 to cause each steering actuator 310a, 310b to conduct steering operation similarly to the embodiment 1.

Also in the vehicle power supply system 1 of the embodiment 2 of the present invention, appropriate connection of the relay 11 can be selected in response to the abnormal conditions of all conductors which are connected to the main and auxiliary batteries 20 and 21, or the electric brake apparatus 100. This allows at least one of the brake systems 130, 131 of the electric brake apparatus 100 and the brake control unit 120 to the positively supplied with power, necessary braking forces can be generated.

Although the embodiments of the present invention have been described with reference to the drawings, it is to be understood that the present disclosure has been made only by way of example and that various modifications and changes can be made by those skilled in the art without departing from the spirit and scope of the invention as set forth in claims.

As mentioned above, a highly reliable vehicle power supply system which allows the electric brake apparatus to be positively supplied with necessary power can be provided in accordance with the present invention.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A power supply system for a vehicle including a plurality of batteries having a main and auxiliary batteries to supply an electric brake apparatus which is separable into at least two brake systems, with electric power via at least two independent power supply lines characterized in that said power supply system further comprises connection switching means for connecting said auxiliary battery to any one of said plurality power supply lines.

2. A power supply system for a vehicle including a plurality of batteries having a main and auxiliary batteries to supply an electric brake apparatus which is separable into at least two brake systems, with electric power via at least two independent power supply lines characterized in that said power supply system further comprises connection switching means for connecting said auxiliary battery to said main battery or at least one of said plurality power supply lines.

3. A power supply system for a vehicle including a plurality of batteries having a main battery which is charged by a generator and an auxiliary battery to supply an electric brake apparatus which is separable into at least two brake systems, with electric power via at least two independent power supply lines characterized in that said power supply system further comprises connection switching means for connecting said main battery to said plurality of power supply lines and for connecting said auxiliary battery to any one of said plurality power supply lines.

4. A power system for a vehicle as set forth in claim 3 wherein that diodes for preventing currents from flowing back to said main battery are provided between said main battery and said plurality of power supply lines and in that a diode for preventing a current from flowing back to said connection switching means is provided between said connection switching means and at least one of said power supply lines.

5. A power supply system for a vehicle as set forth in claim 3 wherein that connection of said auxiliary battery is switched by said connection switching means in response to a current discharged from at least main and auxiliary batteries.

6. A power supply system for a vehicle as set forth in claim 4 wherein that connection of said auxiliary battery is switched by said connection switching means in response to a current flowing through a conductor which is not provided with a diode of the conductors disposed between said connection switching means and said plurality of power supply lines, or a current flowing through a conductor disposed between said auxiliary battery and said connection switching means.

7. A power supply system for a vehicle including a plurality of batteries having a main and auxiliary batteries to supply an electric steering apparatus which is separable into at least two units, with electric power via at least two independent power supply lines characterized in that said system further comprises connection switching means for connecting said auxiliary battery to any one of said plurality power supply lines.

* * * * *